Feb. 24, 1970  J. J. HICKEY ET AL  3,497,831
BROAD-BAND ELECTRO-OPTIC MODULATOR
Filed Oct. 3, 1966  2 Sheets-Sheet 1

INVENTORS
JOHN J. HICKEY
ARVIND S. MARATHAY
BY
Fryer Tjensvold Feix & Phillips
ATTORNEYS

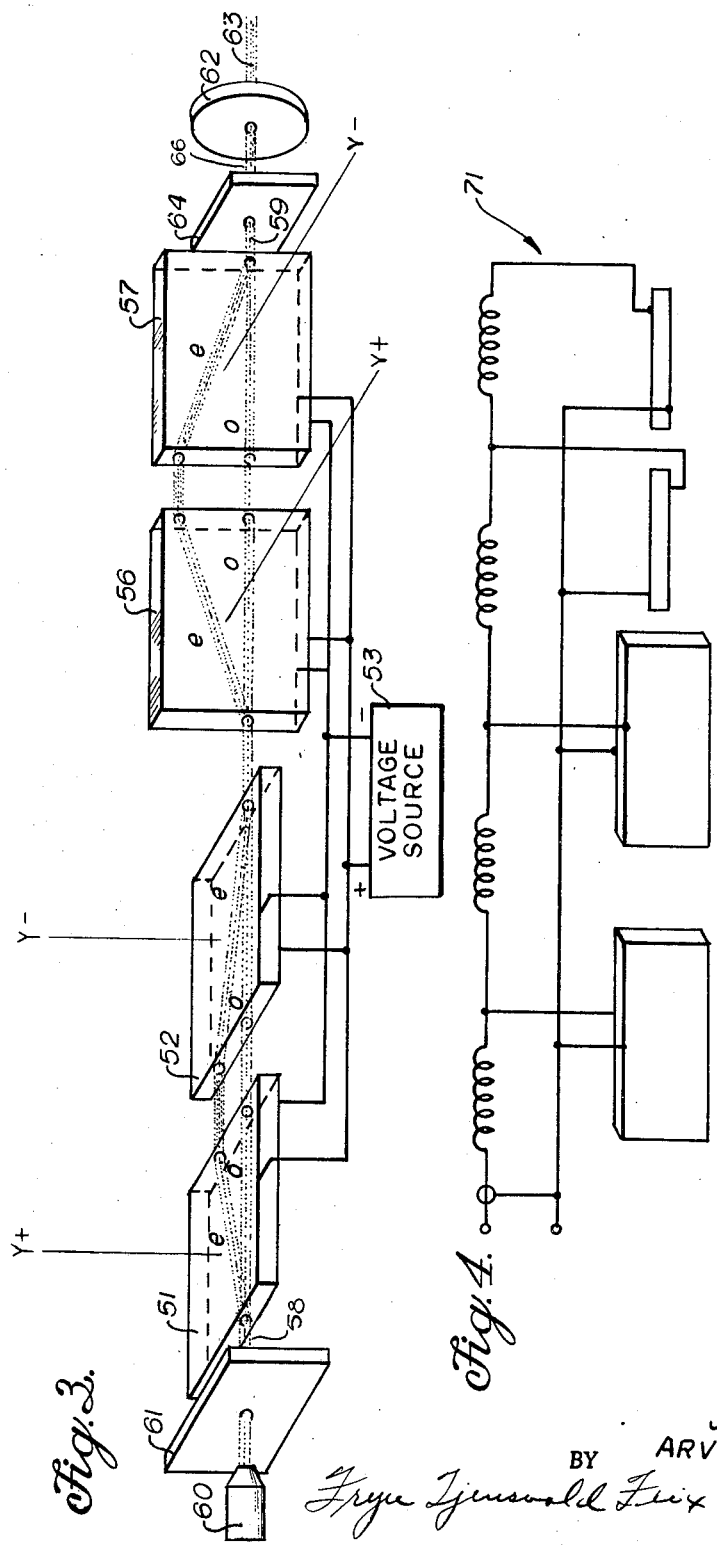

3,497,831
BROAD-BAND ELECTRO-OPTIC MODULATOR
John J. Hickey, Redwood City, and Arvind S. Marathay, Sunnyvale, Calif., assignors, by mesne assignments, to Technical Operations, Incorporated, Burlington, Mass., a corporation of Delaware
Filed Oct. 3, 1966, Ser. No. 583,805
Int. Cl. H03c 1/46
U.S. Cl. 332—31                            2 Claims

ABSTRACT OF THE DISCLOSURE

This disclosure depicts broad-band electro-optic modulators comprising, one embodiment, four serially arranged transversely excited crystals of the $\bar{4}2m$ class. Means are disclosed for temperature-compensating the modulator and for rendering coaxial the input and output beams.

---

Figure 1:
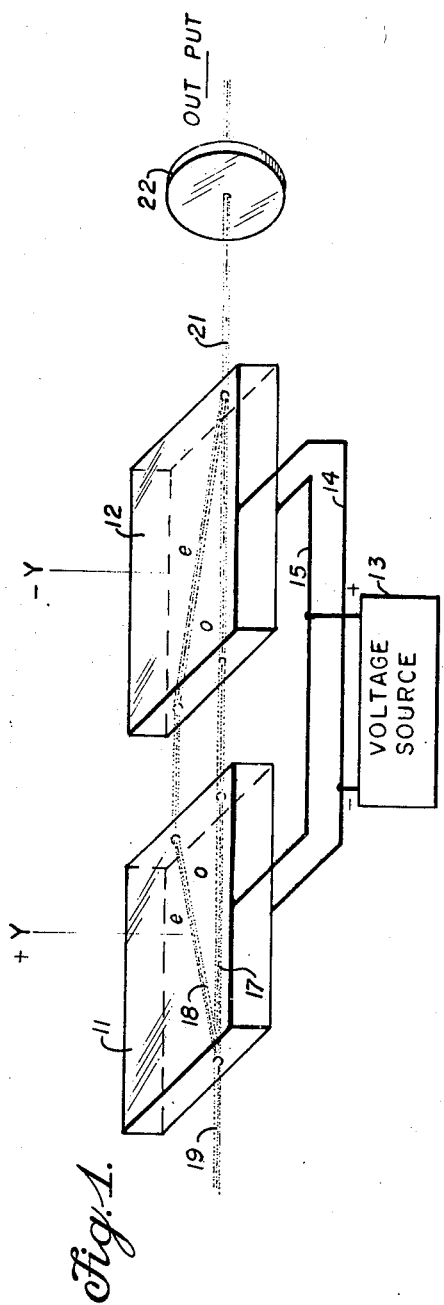

The evolution of electro-optic modulators has in recent years been accelerated by the invention of the laser. The predominant type of modulator utilizes the electro-optic or Pockel's effect in crystals to rotate the plane of polarization of incident linearly polarization radiation which is then passed through an analyzer to produce amplitude modulation. In past years prior to the advent of the laser, the longitudinal mode of the crystals was used primarily to allow a wide acceptance angle of the incident beam of radiation. The development of the laser, however, and its inherently small divergence angle has caused a transition of modulator operation from the longitudinal to the transverse mode. The transverse mode can be made very sensitive by increasing the length to thickness ratio. The previously objectional effect of the natural birefringence encountered in the transverse mode in the majority of crystals exhibiting a large Pockel's effect has been overcome to a large extent by the use of a pair of crystals back-to-back and rotated 90° with respect to each other. This cancels the temperature effect on natural birefringence while adding the electro-optic effects.

While the electro-optical modulators generally described above operate satisfactorily and, in fact, are commercially available, they are not without serious limitations. The minimum half-wave voltage of commercially available modulators is in the area of 1,500 volts. This puts a serious limitation on the frequency of modulation by establishing large power requirements even though capacitance is kept to a minimum. A more fundamental limitation regarding modulators of the commercially available type lies in the dual mechanism involved in the electro-optic process. The electro-optic effect is comprised of a pure electro-optic effect plus a piezo-optical effect. The cut of crystal used almost exclusively in commercially available modulators is the 45° Z cut which when used in the transverse mode exhibits a natural birefringence along a common axis which allows for temperature compensation by using two crystals back-to-back. The 45° Z cut, however, has a piezo-optical effect which is from 10%–50% as large as the pure electro-optic effect. Since the response of the piezo-optical properties of the crystal differs from that of the electro-optical effect (the piezo-optical effect being unable to follow the high frequency applied electric fields—broad band being up to and beyond the megacycle range) a modulator so constructed has a low frequency, or DC electro-optic effect which differs significantly from the high frequency effect where the piezo-optical effect cannot follow. In addition, the piezo-optical coupling can cause the crystal to vibrate at its mechanical resonant frequency, thereby drastically altering the crystal's frequency response. In the case of an applied step function of voltage, a severe "ringing" occurs. Thus, the prior art devices have serious bandwidth problems and require elaborate damping systems for eliminating the natural ringing tendencies of the crystal.

Accordingly, it is an object of the present invention to produce a broad band electro-optic modulator wherein the pure electro-optic effect is maximized and the piezo-optical effect minimized such that the response of the system is virtually flat over a frequency range from zero to and past the megacycle range.

Another object of the present invention is to provide a broad band electro-optic modulator which is temperature compensated and has an on axis output.

Further objects of the present invention include providing a broad band electro-optic modulator having a half-wave shift voltage of 180 volts or less, the advantageous use of a 45° Y cut crystal for broad band electro-optic modulators, and providing a broad band electro-optic modulator using four crystals which are energized by a transmission line in which they are electrically interconnected inductively.

Further and more specific objects and advantages of the present invention are made apparent in the following specification wherein a preferred form of the invention is described by reference to the accompanying drawings.

Figure 2:
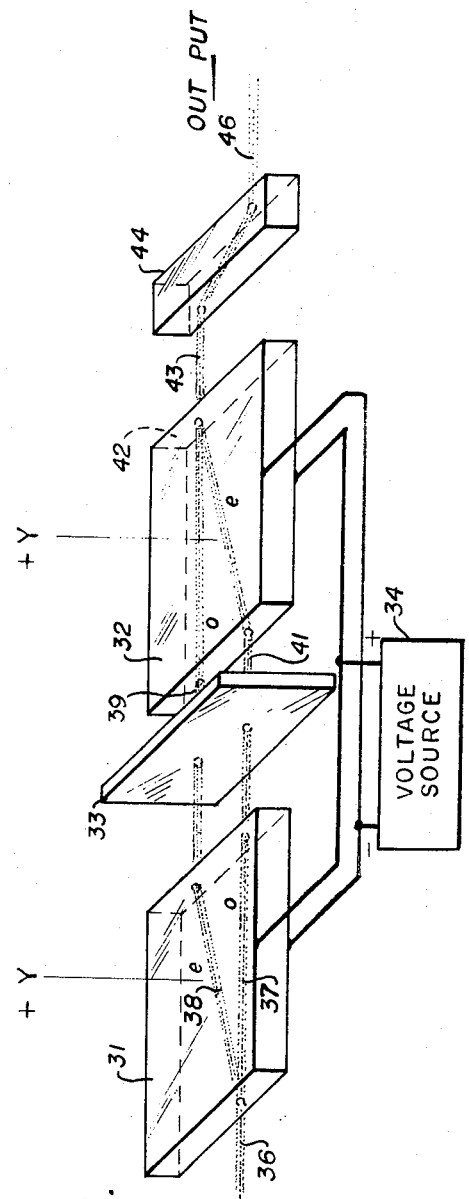

In the drawings:
FIG. 1 is a schematic illustration of one embodiment of the present invention employing two crystals;
FIG. 2 is a schematic illustration of a second embodiment of the present invention employing two crystals and a half-wave retardation plate;
FIG. 3 is a schematic illustration of an embodiment of the present invention employing two pairs of crystals at right angles to each other; and
FIG. 4 is a schematic illustration of a four-crystal embodiment of the present invention disposed inductively within a transmission line.

Referring now to FIG. 1, a pair of crystals 11 and 12 are aligned along their transverse axes with their Y axes at 180° to one another and electrically joined in parallel to a source of voltage 13. The conductors 14 and 15 which join the crystals to the voltage source 13 are so arranged that both the crystals experience a positive voltage in their +Y direction. The crystals 11 and 12 are specifically selected to be 45° Y cut crystals selected from the class $\bar{4}2m$ crystals (potassium dihydrogen phosphate and its isomorphs), which crystals are characterized by a natural birefringence which produces an ordinary beam 17 and an extraordinary beam 18 in response to a linearly polarized input beam 19, oriented at 45°.

In the specification the crystals are described, by way of example, as being 45° Y cut. It is obvious that the crystals may, alternatively, be crystals cut perpendicular to the other of the equivalent two-fold axes (the X axis) i.e., 45° X cut crystals. Unlike Z cut crystals, Y cut crystals have a birefringence which produces an ordinary beam and an extraordinary beam which propogate in two different directions. The fact that these paths are not coincident has made Y cut crystals generally unacceptable for use in modulators. When crystals of the class $\bar{4}2m$ are cut perpendicular to their Y axis (Y cut) they exhibit relatively less piezo-optical effect (as low as 1%) when used in the transverse mode as shown (the electrical field applied transversely across the crystal) than crystals of other cuts. Thus there is little change in crystal response over a frequency range from zero to and beyond megacycles. In addition, the amount of ringing due to the piezo-optical effect is virtually nonexistent.

(Since natural bifringence of a 45° Y cut $\bar{4}2m$ crystal in the transverse mode produces two separate beams, the present invention teaches means for overcoming this problem so that the outstanding characteristics of these crystals can be advantageously used. Accordingly, an input beam 19 of 45° polarization, is directed into the crystal 11 where it splits into an ordinary beam 17 and an extraordinary beam 18, which pass into crystal 12 where the electrical field transversely across the crystal causes the beam to recombine to produce a single output beam 21. Beam 21 is then directed through an analyzer 22 producing amplitude modulation. The difference in paths taken by the ordinary and extraordinary components of the input beam 19 is due to the fact that the index of refraction for the extraordinary beam ($e$ index) differs from that of the ordinary beam. In addition, the path length of the extraordinary beam is a function of the voltage supplied across the crystal, while the path of the ordinary beam is independent of voltage. Thus, a change in voltage establishes a change in path length for the extraordinary beam relative to the ordinary beam which enables the polarization of the recombined beam at the output of crystal 12 to be varied. For a system to produce 100% modulation, it is necessary for sufficient voltage (half-wave voltage) to be applied to produce a half-wave length change of the extraordinary beam path length. For the present invention—a 45° Y cut crystal of ADP ($NH_4H_2PO_4$) having a 40/1 $1/d$ ratio—the half-wave voltage is approximately 180 volts, almost a complete order of magnitude less than presently available modulators.

The embodiment of FIG. 1 has the disadvantage of not being temperature compensated. When the temperature of the crystal changes the index of the extraordinary beam changes so that a change of path length relative to the path length of the ordinary beam occurs even though no change in voltage has occurred. Since like changes occur in both crystal 11 and crystal 12, the crystals reinforce the temperature error rather than cancel it.

FIG. 2 discloses a system which is temperature compensated. A crystal 31 and a crystal 32 ($\overline{4}2m$ crystals) are aligned along their transverse axes with their Y axes parallel and with a half-wave retardation plate 33 disposed therebetween. A voltage source 34 is joined in parallel across each of the crystals, such that crystal 31 has a positive voltage in its +Y direction while crystal 32 has a positive voltage in its −Y direction. A 45° polarized input beam 36 splits into an ordinary beam 37 and an extraordinary beam 38. The half-wave retardation plate 33 rotates the plane of polarization of both beams 90° such that when the beams enter crystal 32, the beam which travelled as the ordinary beam in crystal 31 travels as the extraordinary beam while the extraordinary beam travels as the ordinary beam. Thus, beam 39 passes straight through the crystal 32 to its output edge 42 since an ordinary beam is unaffected by the voltage across the crystal. Extraordinary beam 41, however, moves across crystal 32 in precisely the same manner as extraordinary beam 38 moved across crystal 31 and thus recombines with beam 39 to form an output beam 43. Thus, while in FIG. 1 one of the beam paths included two extraordinary beams, and the other path included two ordinary beams, the embodiment of FIG. 2 is arranged such that one beam path includes both an ordinary and extraordinary beam and likewise for the other beam path. Now a temperature change is compensated for since it produces a like change in the path length of both beam paths so that the two paths do not experience any relative change.

While the embodiment of FIG. 2 has the advantages of insignificant piezo-optical effects, low voltage requirements and temperature compensations, this particular arrangement does produce an output beam 43 which is not axially aligned with the input beam 36. This is, however, a minor limitation since the insertion of a parallel plate 44 in the path of output beam 43 can be made to easily shift the path of the output beam such that an ultimate output beam 46 is axially aligned with the input beam 36.

Referring now to FIG. 3, a pair of class $\overline{4}2m$ crystals 51 and 52 are aligned along their transverse axes with their Y axes at 180° to each other. The crystals are joined to a voltage source 53 in a manner which produces a field in their transverse mode, in precisely the same manner as described with reference to the embodiment of FIG. 1. A second pair of substantially identical crystals 56 and 57 have their transverse axes aligned with the transverse axes of crystals 51 and 52 and their Y axes 180° to each other and 90° to the Y axes of crystals 51 and 52. Crystals 56 and 57 are electrically joined to the voltage source 53 in such a manner as to produce an electric field in their transverse modes wherein the field is in the +Y direction in both crystals (as is the case in crystals 51 and 52). The operation of each pair of crystals separately is precisely the same as that described with reference to the embodiment of FIG. 1 in that an input beam polarized at 45° splits into an ordinary and extraordinary beam which is recombined by the second of the pair of crystals. The result of disposing the second pair of crystals at 90° to the first pair of crystals is to have the beam following the ordinary path in the first set of crystals, follow the extraordinary path in the second set of crystals, while the extraordinary beam in the first set of crystals becomes the ordinary beam in the second set of crystals. Since each complete beam path through all four crystals includes an extraordinary path as well as an ordinary path, the effects of temperature changes are compensated such that the output beam is independent of temperature changes. In addition, the input beam 58 is on axis with the output beam 59 so that it is not necessary to use a parallel plate for axial realignment as was the case in the embodiment of FIG. 2. It is also to be noted that, although this embodiment of the invention requires four crystals, it does not require the use of a half-wave plate, and to that extent is in some ways more advantageous. The use of four crystals in place of two, such as suggested above, or one, such as used in some prior art devices, has the advantage of requiring less electro-optical effect on the beam per crystal to produce a half-wave shift between the input and output, whereby the requirements of the voltage source 53 are reduced.

As mentioned above, the input beam, such as beam 58, must be polarized at 45° to the Y axis of crystal 51 (all angular measurements will be relative to the +Y axis of crystal 51) in order to produce an ordinary and extraordinary beam of substantially equal amplitudes. This requires a specific orientation of a laser beam source 60 which, in some instances, can create some problems. In order to eliminate the requirement that the laser beam source have a specific orientation, the present invention teaches the use of a quarter-wave plate 61 disposed between the laser beam source 60 and the crystal 51, together with a quarter-wave plate 64 between the crystal 57 and analyzer 62. The quarter-wave plate 61 has the effect of transforming a beam polarized at other than 45° into either a circular or elliptically polarized beam which is transformed into an ordinary or extraordinary beam in crystal 51 as is required by the system. In the event that the polarization of the beam from source 60 is at 45°, the quarter-wave plate 61 is oriented such that it has no effect on the beam and crystal 51 sees a beam polarized at 45° which, as previously described, produces an ordinary and extraordinary beam. When the beams recombine at 59 they will generally not be linearly polarized and thus plate 64 is required. By orienting plate 64 at 45° to crystal 57 and 90° to plate 61 the analyzer is assured of seeing a linearly polarized beam 66.

When the voltage from the source 53 to the crystals is at zero, the magnitude of output beam 59 as it emerges from an analyzer 62 as beam 63 is a function of the difference between the path lengths of the ordinary and extraordinary beams. Since the difference in path lengths without voltage is a function of absolute crystal length (which cannot readily be controlled to wavelength accuracies) the intensity of the output beam 63 is not necessarily zero under these conditions. Thus, in order to have the output beam at zero intensity, it may be necessary to apply a voltage from source 53 which establishes the path length difference which corresponds to that polarization which is completely absorbed by analyzer 62. The rotation of analyzer 62 in the beam 59 is not capable of producing the desired zero output at zero voltage since the output beam 59 will generally be either elliptically or circularly polarized. If the output beam is linearly polarized, however, then the output beam 63 can be made zero when the applied voltage is zero by rotating the analyzer 62 until its polarizing axis is at 90° to the polarization of the beam. Thus, the presence of quarter-wave plate 64 disposed in the output beam 59 between analyzer 62 and crystal 57 with its optic axis at 45° to the Y axis of crystal 57 and 90° to the optic axis of the quarter-wave plate 61 gives the system an added advantage. The quarter-wave plate 64 operated to deliver a linearly polarized beam 66 to analyzer 62 regardless of the polarization of beam 59, making it possible to produce a zero magnitude output beam 63 at zero applied voltage by rotation of analyzer 62 to the proper orientation relative to the beam's axis of polarization.

Thus, the complete system illustrated in FIG. 3 provides a broad band electro-optic modulator which is temperature compensated, which does not require any specific orientation of the laser beam source 60, and which is capable of having a zero intensity output for zero voltage at the voltage source 53. In addition, the input beams and output beams are coaxial.

Referring now to FIG. 4, the four crystals of the modulator of FIG. 3 are shown in combination with a transmission line 71 in which they are inductively coupled. This arrangement allows the use of a large number of crystals with little change in drive requirements due to the added capacitance. The transmission line 71 may produce a delay, however, which must be compensated for by optical delay means between the crystals, which are easily provided for by devices well known in the art.

While the crystals used in the various embodiments of the present invention described above have been designated as belonging to class $\bar{4}2m$ generally, superior results have been obtained using ADP or $KD_2P$ crystals specifically.

What is claimed is:
1. An electro-optic modulator for modulating an input laser beam having a predetermined plane of polarization, comprising:
   a set of four electro-optic crystals of the class $42m$ serially arranged in the beam, each crystal being of such a cut and orientation that the beam propagates through the crystal perpendicular to a first one of the two-fold axes of the crystal and at substantially 45° to the remaining two-fold axis and to the optic axis thereof, said beam being directed into said crystals with said plane of polarization oriented at 45° with respect to said first two-fold axis;
   two of said crystals having the positive direction of their respective first two-fold axes reversed relative to the positive direction of the said first two-fold axes of the remaining two crystals whereby beams entering and exiting from the modulator are coaxial;
   means for effectively causing a 90° relative rotation of said plane of polarization of said input beam and said first two-fold axes during passage of said beam through two of said four crystals whereby the ordinary ray in two of the crystals is the extraordinary ray in the other two crystals, canceling any effects due to natural birefringence in the crystals;
   electrode means embracing each of said crystals transverse to the direction of said beam propagation and along the direction of said first of said two-fold axes;
   means for applying an electric signal to each of said electrode means with such a polarity that changes in the index of refraction induced in the crystals by the presence of said electric fields are cumulative; and
   polarization analyzer means in the output beam from said crystals oriented at 90° relative to said plane of polarization of said input beam.

2. An electro-optic modulator for modulating an input laser beam having a predetermined plane of polarization, comprising:
   a set of four electro-optic crystals of the class $\bar{4}2m$ serially arranged in the beam, each crystal being of such a cut and orientation that the beam propagates through the crystal perpendicular to a first one of the two-fold axes of the crystal and at substantially 45° to the remaining two-fold axis and to the optic axis thereof, said beam being directed into said crystals with said plane of polarization oriented at 45° with respect to said first two-fold axes;
   the first and third of said crystals having the positive direction of their respective first two-fold axes reversed relative to the positive direction of the said first two-fold axes of the second and fourth crystals whereby beams entering and exiting from the modulator are coaxial;
   means for supporting said third and fourth crystals at 90° relative to said first and second crystals whereby the ordinary and extraordinary rays in the first and second crystals become the extraordinary and ordinary rays respectively in the third and fourth crystals, canceling any effects due to natural birefringence in the crystals;
   electrode means embracing each of said crystals transverse to the direction of said beam propagation and along the direction of said first of said two-fold axes;
   means for applying an electric signal to each of said electrode means with such a polarity that changes in the index of refraction induced in the crystals by the presence of said electric fields are cumulative; and
   polarization analyzer means in the output beam from said crystals oriented at 90° relative to said plane of polarization of said input beam.

References Cited

Ley, "Electronics Letters" January 1966, p. 12.
Ley, "Electronics Letters" April 1966, pp. 138–139.

ROY LAKE, Primary Examiner
DARWIN R. HOSTETTER, Assistant Examiner

U.S. Cl. X.R.
350—150